(12) United States Patent
Lane, Jr.

(10) Patent No.: US 8,094,035 B2
(45) Date of Patent: Jan. 10, 2012

(54) STORAGE RACK SAFETY DEVICE

(75) Inventor: Wendell C. Lane, Jr., Romeo, MI (US)

(73) Assignee: Autoliv ASP, Inc., Ogden, UT (US)

(*) Notice: Subject to any disclaimer, the term of this patent is extended or adjusted under 35 U.S.C. 154(b) by 322 days.

(21) Appl. No.: 12/566,168

(22) Filed: Sep. 24, 2009

(65) Prior Publication Data

US 2011/0068943 A1 Mar. 24, 2011

(51) Int. Cl.
*G08B 21/00* (2006.01)
(52) U.S. Cl. ..... 340/668; 340/665; 340/677; 340/686.2; 340/691.3
(58) Field of Classification Search ......... 340/665–668, 340/677, 686.2, 691.3; 414/148, 226.04, 414/232; 211/13.1, 151, 59.2
See application file for complete search history.

(56) References Cited

U.S. PATENT DOCUMENTS

| 3,770,147 | A | * | 11/1973 | Kito et al. | 414/282 |
| 3,868,662 | A | * | 2/1975 | Russell, Jr. | 73/862.471 |
| 4,532,500 | A | * | 7/1985 | Henk | 340/675 |
| 4,919,275 | A | * | 4/1990 | Futch et al. | 211/1.57 |
| 5,273,170 | A | * | 12/1993 | Azzopardi et al. | 211/189 |
| 5,302,942 | A |   | 4/1994 | Blau | |
| 5,848,707 | A |   | 12/1998 | Hill | |

FOREIGN PATENT DOCUMENTS

| JP | 10-059511 | 3/1998 |
| JP | 2007/252462 | 10/2007 |

* cited by examiner

*Primary Examiner* — Daniel Wu
*Assistant Examiner* — Son M Tang
(74) *Attorney, Agent, or Firm* — Sally J. Brown; Harness Dickey

(57) ABSTRACT

A safety device for a storage rack can include a length of webbing configured to span across a rear side of the storage rack. A sensor device can be coupled to one end of the webbing and a signaling device can be configured to communicate with the sensor device. The signaling device can include a selectively actuatable alert indicator. The sensor device can be operable to sense an increase in tension in the webbing when an item is placed in a position on the storage rack so as to engage the webbing. The sensor device can generate a signal indicative of the increase in tension and communicate the signal to the signaling device. The signaling device can be operable to actuate the at least one alert indicator responsive to the communicated signal so as to provide an indication of a position of the item relative to the storage rack.

21 Claims, 5 Drawing Sheets

US 8,094,035 B2

STORAGE RACK SAFETY DEVICE

FIELD

The present disclosure relates generally to a safety and positioning device for a storage rack.

BACKGROUND

This section provides background information related to the present disclosure which is not necessarily prior art.

Storage racks are commonly used in manufacturing facilities and other operations where palletized goods are required to be stacked and stored. A forklift is typically used to place the palletized goods in the storage racks. These storage racks can often include multiple levels stacked vertically such that several of the stacked levels are above a line of sight of the forklift driver. In such a scenario, it can be difficult for the forklift driver to ascertain proper positioning of the palletized goods on the storage rack.

Additionally, the palletized goods can often be of a size so as to prevent the forklift operator from being able to effectively see behind or around the palletized goods when placing the goods on the storage rack. Under such a circumstance, it can also be difficult to effectively position the palletized goods on the storage rack, even at one of the lower levels.

Thus, while storage rack arrangements have generally worked for their intended purpose, there remains a need for continuous improvement in the relevant art.

SUMMARY

This section provides a general summary of the disclosure, and is not a comprehensive disclosure of its full scope or all of its features.

According to one aspect, the present teachings provide a safety device for a storage rack. A length of webbing can be configured to span across a rear side of the storage rack that is adapted to store an item. A sensor device can be coupled to one end of the webbing and a signaling device can be configured to communicate with the sensor device. The signaling device can include at least one selectively actuatable alert indicator. The sensor device can be operable to sense an increase in tension in the webbing when the item is placed in a position on the storage rack so as to engage the webbing. The sensor device can be further operable to generate a signal indicative of the increase in tension and communicate the signal to the signaling device. The signaling device can be operable to actuate the at least one alert indicator responsive to the communicated signal to provide an indication of a position of the item relative to the storage rack.

According to another aspect, the present teachings provide a storage structure assembly having a storage rack and a safety device. The storage rack can include a base configured to receive an item where the base includes a front side opposite a rear side, and first and second sides spaced apart from each other and connecting the respective front and rear sides. A first pair of legs can be coupled to the base proximate the rear side and a second pair of legs can be coupled to the base proximate the front side. The safety device can include first and second brackets adjustably coupled to the respective first pair of legs, a length of webbing configured to span across the rear side of the storage rack, and a sensor device coupled to one of the first and second brackets. The webbing can be coupled at one end to the sensor device and at another end to the other of the first and second brackets. A signaling device can be configured to communicate with the sensor device and can include at least one selectively actuatable alert indicator. The sensor device can be operable to sense movement or a change in tension in the webbing when the item is placed in a position on the base of the storage rack so as to engage the webbing. The sensor device can be further operable to generate a signal indicative of the movement or change in tension and communicate the signal to the signaling device. The signaling device can be operable to actuate the at least one alert indicator responsive to the communicated signal to provide an indication of a position of the item relative to the storage rack.

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, the appended claims and the following drawings. The drawings are for illustrative purposes only and are not intended to limit the scope of the present disclosure.

DETAILED DESCRIPTION

Figure 1:
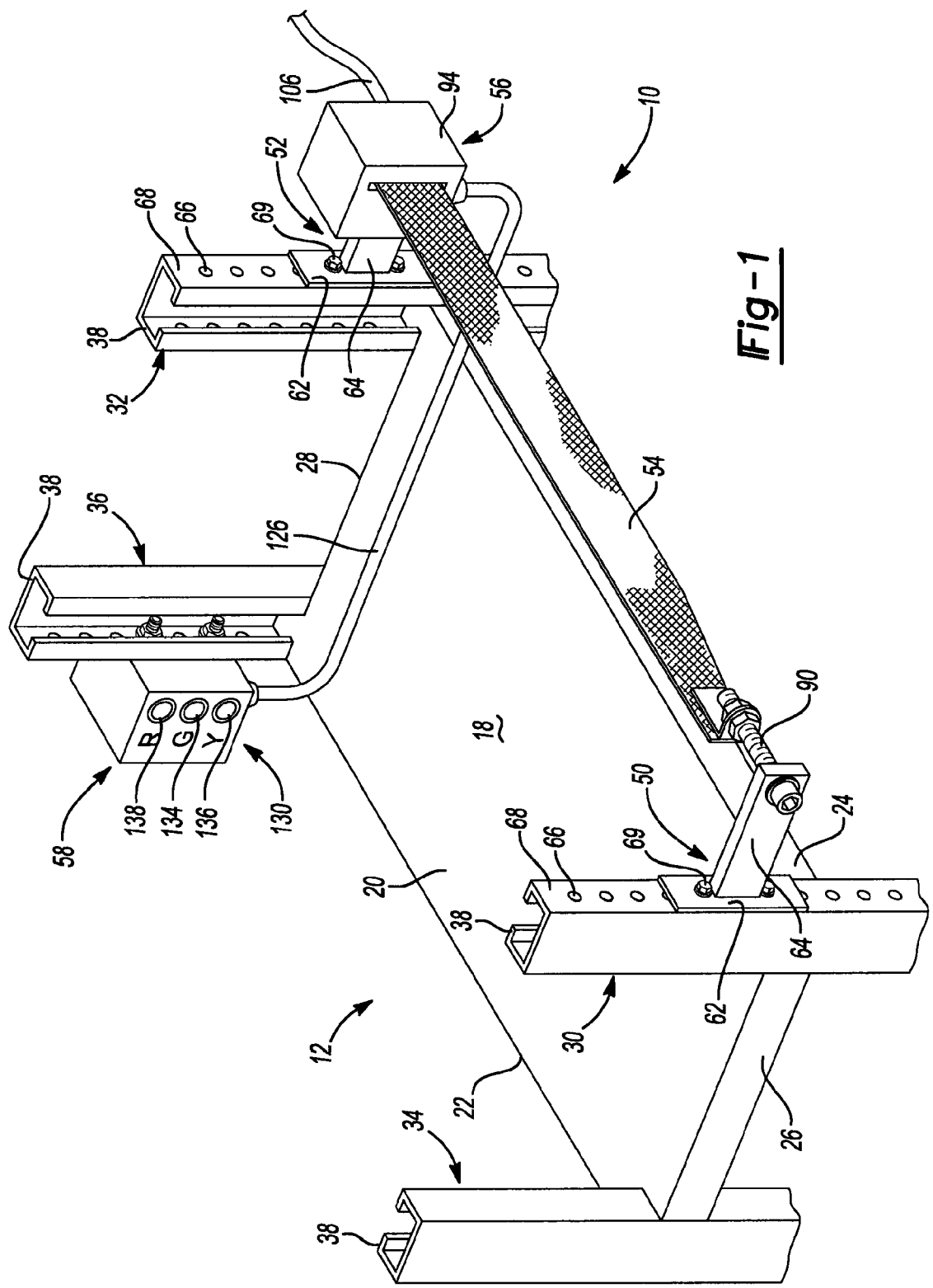
FIG. 1 is a perspective view of an exemplary storage rack having a safety and positioning device in accordance with the teachings of the present disclosure.

The following description is merely exemplary in nature and is not intended to limit the present disclosure, its application, or uses. It should be understood that throughout the drawings, corresponding reference numerals indicate like or corresponding parts and features.

Figure 4:
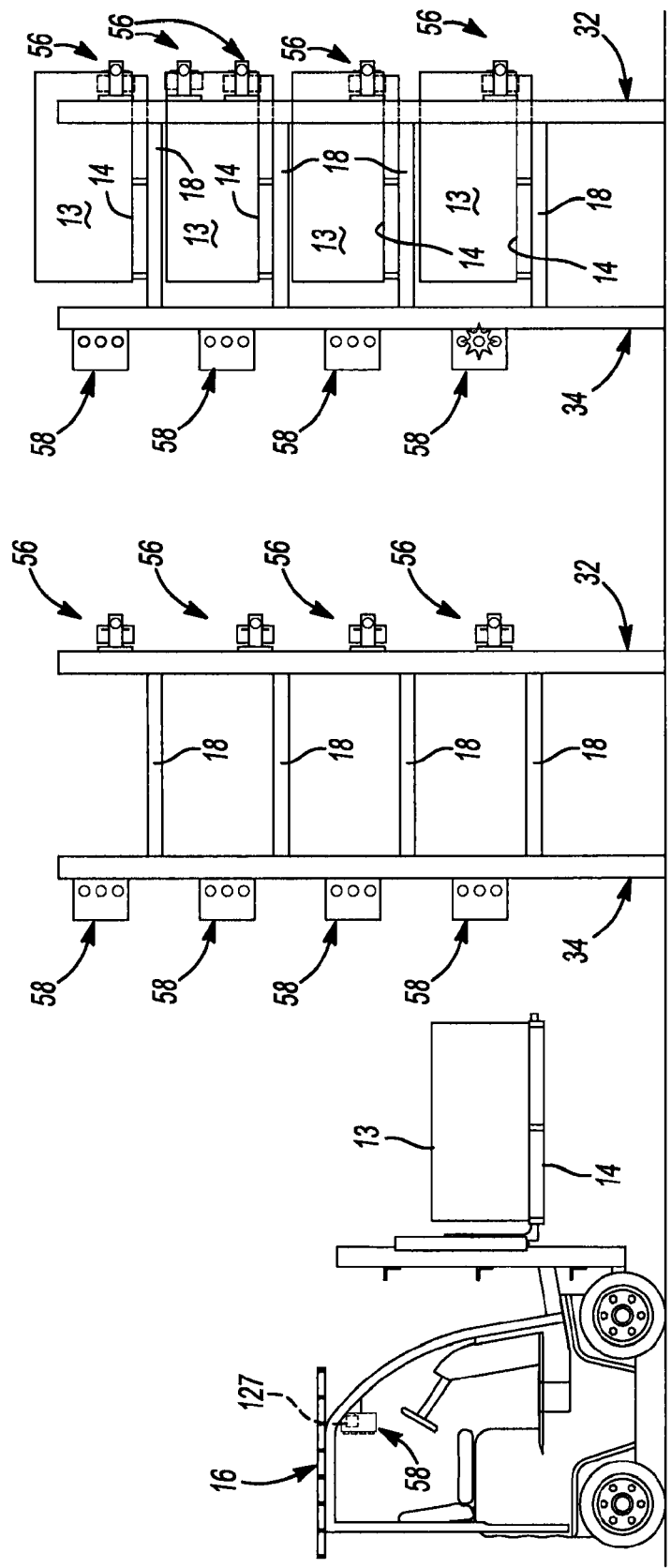
FIG. 4 is a side view of an exemplary storage rack having multiple levels with each level including at least one safety and positioning device in accordance with the teachings of the present disclosure.

With initial reference to FIGS. 1 and 4, a safety and positioning device 10 is shown operatively associated with a storage rack 12. The storage rack 12 may be any conventional storage rack suitable for receiving boxes, packages or other items 13 on a pallet 14 that is positioned on the rack 12 by a forklift 16 or other suitable device. The storage rack 12 may include a floor or base 18 having a generally rectangular shape 20. Base 18 may include various shapes depending on, for example, space available for rack 12 and the size of pallets 14 that may be placed on base 18. Base 18 may include a front side 22, a rear or back side 24 and lateral sides 26, 28 connecting the front and back sides 22, 24, respectively. Support legs 30, 32 may be coupled to sides 26, 28 adjacent to back side 24, and support legs 34, 36 may be coupled to sides 26, 28 adjacent to front side 22, as shown in FIG. 1. The legs 30-36 may include a C-channel configuration 38 for added strength or other configurations suitable for providing additional strength while also serving to reduce an amount of material required to provide the added strength.

The storage rack 12 may include multiple levels having multiple bases 18 spaced apart from each other such that each base 18 can receive pallets 14 containing a package or packages 13, as shown in FIG. 4. The base 18 can also be permanently secured to legs 30-36 or can be adjustably secured to legs 30-36 such that a position of base 18 can be varied relative to the legs and/or another base 18.

With continued reference to FIG. 1 and additional reference to FIGS. 2-3 and 5-6, the safety and positioning device 10 will now be described. The safety and positioning device 10 may include first and second bracket assemblies 50, 52, a length of webbing 54, a sensor device 56 and a signaling device 58. The first and second bracket assemblies 50, 52 may each include a base member 62 and an extension member 64 extending from base member 62 and away from back side 24 of rack 12, as shown in FIG. 1. Base member 62 may be secured to mounting apertures 66 on a side portion 68 of legs 30, 32. A fastener, such as a threaded bolt 69, may be used to secure bracket assemblies 50, 52 to mounting apertures 66, as also shown in FIG. 1.

Figure 2:
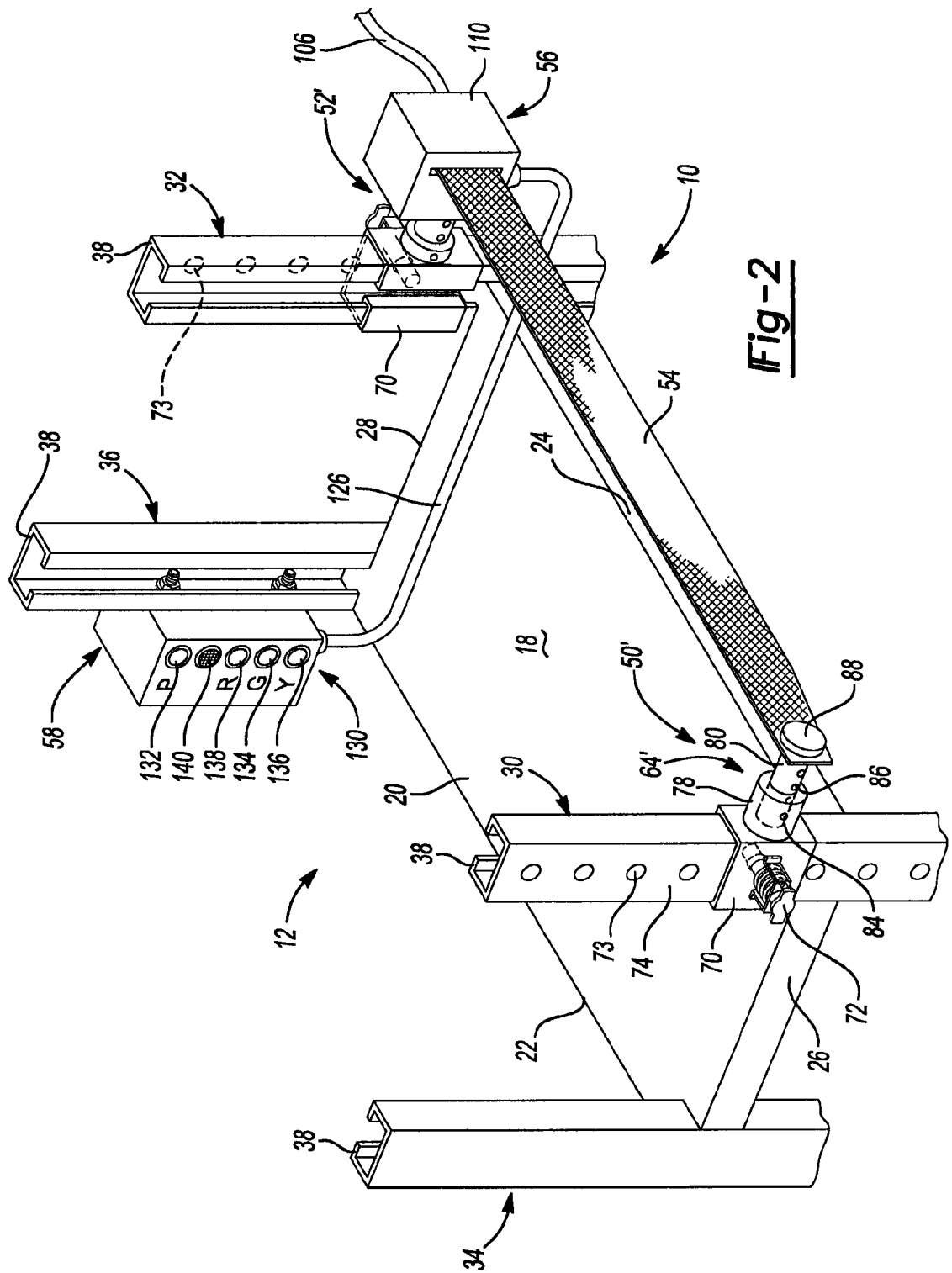
FIG. 2 is a perspective view of an exemplary storage rack having an alternative safety and positioning device in accordance with the teachings of the present disclosure.

In an alternative configuration, the safety and positioning device 10 may include first and second bracket assemblies 50', 52', as shown in FIG. 2. Bracket assemblies 50', 52' may each include a sleeve 70 configured to have a shape corresponding to the C-channel configuration 38 of legs 30-36 such that a pair of sleeves 70 can be slidably received over each of legs 30, 32. Sleeve 70 may further include a spring loaded pin assembly 72 arranged to be received in one of a plurality of apertures 73 spaced along a side 74 of each of legs 30, 32 so as to position first and second bracket assemblies 50', 52' in a desired position or height relative to base 18.

Bracket assemblies 50, 52' may use extension members 64 as described above, or may alternatively each use a telescoping extension member arrangement 64'. Telescoping extension arrangement 64' may include a first bracket member 78 and a second bracket member 80 arranged to be slidably received in first bracket member 78 in a telescoping fashion. First bracket member 78 may include an aperture 84 and second bracket member 80 may include a plurality of apertures 86 where each one of the plurality of apertures 86 are arranged to align with aperture 84 as the second bracket member is slidably moved toward or away from the back side 24 of rack 12. The telescoping extension member arrangement 64' may therefore be utilized to position an end 88 of second bracket member 80 at various positions relative to back side 24.

The length of webbing 54 may include a polyester woven webbing material such as the material used in a conventional seat belt application. The webbing 54 can provide the advantages of being wear resistant, flexible and relatively inexpensive. The webbing 54 may be coupled at one end to an adjustment mechanism 90 and at another end to the sensor device 56. The adjustment mechanism 90 may be secured to one of the extension members 64 and the sensor device 56 may be secured to the other extension members 64 such that webbing 54 extends across the back side 24 of rack 12 from leg 30 to leg 32. Alternatively, the adjustment mechanism 90 and the sensor device 56 may each be secured to respective ends 88 of second telescoping bracket members 80 of first and second bracket assemblies 50', 52'. The webbing may span from leg 30 to leg 32 substantially parallel to back side 24, or may be positioned to span in a non-parallel configuration using bracket assemblies 50', 52' as may be desired to, for example, accommodate packages with an asymmetric rearward facing configuration.

Figure 5:
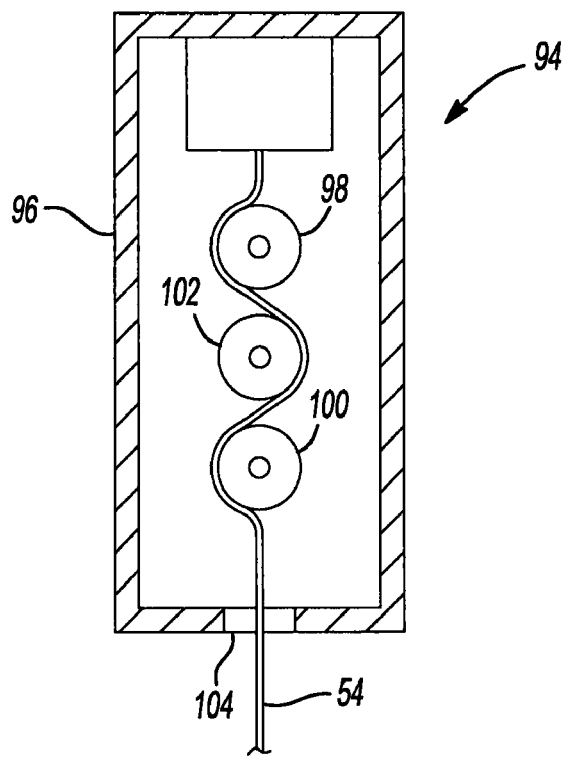
FIG. 5 is a partial schematic view of an exemplary tension sensing device in accordance with the teachings of the present disclosure.

The sensor device 56 may include a tension sensor device 94 arranged to sense a tension in webbing 54 coupled thereto. With particular reference to FIG. 5, one non-limiting example of tension sensor device 94 is shown. The tension sensor device 94 may include a housing 96, a first roller 98, a second roller 100 and a tension sensor 102. The webbing 54 may be secured to housing 96 and then routed under first roller 98, over tension sensor 102, under second roller 100 and then through an aperture 104 in housing 96. When a tensile force is imparted onto webbing 54, a corresponding force is imparted onto tension sensor 102 as the webbing stretches which can be processed into a calibrated output signal for use with signaling device 58, as will be described in more detail below. The tension sensor device 94 may also include a power input source such as an electrical line 106.

Figure 6:
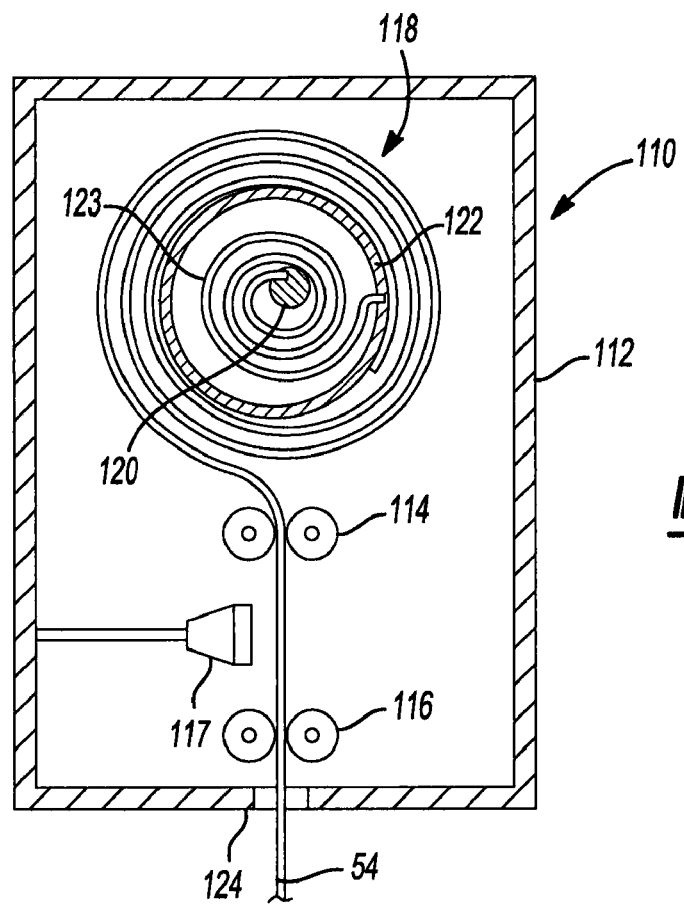
FIG. 6 is a partial schematic view of an exemplary movement sensing device in accordance with the teachings of the present disclosure.

In an alternative configuration, sensor device 56 may include a movement sensing device 110 configured to sense movement of webbing 54. With particular reference to FIGS. 2 and 6, one non-limiting example of movement sensing device 110 is shown and includes a housing 112, a first and second pair of rollers 114, 116, an optical sensor 117, and a retractor assembly 118. Retractor assembly 118 may include an axle 120 for rotatably supporting a roller 122. A rotatable recoil spring 123 may be wound around axle 120 with one end coupled to axle 120 and another end coupled to an inside of roller 122, as shown in FIG. 6. Webbing 54 can be fed through an aperture 124 in housing 112, between rollers 114 and 116 and then wound around an outside of roller 122. Recoil spring 123 may be pre-tensioned and wound around axle 120 in an opposite direction as webbing 54 is wound around roller 122, such that roller 122 is biased in such a fashion as to impart a predetermined amount of tension on webbing 54 when webbing 54 is attached at an opposite end to one of extension members 64 or 64'. In this manner, retractor assembly 118 may be used to provide an amount of length adjustment to webbing 54 by having a suitable amount of webbing 54 wound around roller 122 to span various lengths between legs 30, 32, as well as impart a predetermined amount of tension on webbing 54 as it spans between legs 30, 32. Optical sensor 117 may be configured to sense movement of webbing 54 as it moves or travels between the first and second rollers 114, 116. The optical sensor 117 can be configured to process any sensed movement into a calibrated output signal for transmitting to signaling device 58, as will be described in more detail below.

The tension sensor device 94 can be calibrated to process an amount of tension sensed in webbing 54 in at least three predetermined ranges, including a first or acceptable range, a second or intermediate range outside or beyond the acceptable range, and a third or unacceptable range outside or beyond the second range. Similarly, the movement sensing device 110 can be calibrated to process an amount of movement of the webbing 54 into the same three predetermined ranges, namely the acceptable range, the intermediate range, and the unacceptable range. The predetermined acceptable, intermediate and unacceptable ranges of tension or movement can be correlated to acceptable, intermediate and unacceptable ranges of positions, respectively, of the pallet 14 and/or packages 13 relative to the back side 24 of rack 12, as will be further described below. It should also be appreciated that devices 94, 110 can be calibrated to process fewer or more predetermined amounts of movement or tension.

The signaling device 58 can be configured to receive the output signal from either the tension sensor device 94 or movement sensing device 110 via an electrical coupling 126. Alternatively, signaling device 58 can be configured to wirelessly communicate with tension sensor device 94 or movement sensing device 110. For example, signaling device 58 can include a radio frequency receiver 127 arranged to communicate with a radio frequency transmitter 128 of the tension sensor or movement sensing devices 94, 110. In this alternative configuration, signaling device 58 can be positioned in locations remote from storage rack 12, such as in a driver viewable area of forklift 16. It should be appreciated that multiple signaling devices 58 can also be utilized where, for example, one signaling device 58 is coupled to storage rack 12 and another signaling device 58 is disposed in forklift 16.

The signaling device 58 can include a plurality of externally visible indicators 130 for use in providing visible feedback signals or alerts to a forklift driver or other personnel in proximity to the storage rack 12. The visible indicators 130 can include, but are not limited to, a power indicator 132, an indicator 134 illuminated with a green color, an indicator 136 illuminated with a yellow color, and an indicator 138 illuminated with a red color. The signaling device 58 may be configured to illuminate the power indicator when power is received to the signaling device 58, and may be configured to illuminate visible indicators 134, 136, 138 when the received output signal corresponds to the acceptable, intermediate, and unacceptable ranges, respectively.

Signaling device 58 may additionally include an audible indicator 140 (FIG. 2) for providing an audible alert to the forklift driver or other personnel in proximity to the storage rack 12. The signaling device 58 can be configured to process the output signal from the tension or movement sensing devices 94, 110, and generate a preconfigured audible alert or message in response to certain conditions. For example, the signaling device 58 can be configured to emit an audible alert via audible indicator 140 when an output signal corresponding to the intermediate range is received and another, different audible alert when an output signal corresponding to the unacceptable range is received. Alternatively, the signaling device can be configured to provide an audible alert only when the output signal received corresponds to the unacceptable range. It should be appreciated that the signaling device 58 can also be configured with information display features and fewer or more visual and audible alert indicators than described above. For example, signaling device 58 could also be configured to include a display device where status information regarding pallet positioning in connection with multiple storage racks 12 is displayed.

In operation, the safety and positioning device 10 can be configured for coupling to rack 12 via first and second bracket assemblies 50, 52 or 50', 52', respectively. Once coupled, the webbing 54 can span across a back side 24 of rack 12 as shown, for example, in FIGS. 1 and 2. The webbing 54 can be adjusted to a desired position relative to base 18 depending on various package and pallet sizes that may be desired to be positioned on rack 12. For example, webbing 54 may be adjusted vertically relative to base 18 to accommodate particularly short packages by positioning base members 62 or sleeves 70 at an appropriate position on legs 30, 32 such that the short package would contact webbing 54 when placed on base 18 and advanced sufficiently rearward.

In addition, a horizontal position of the webbing may be adjusted to also accommodate various pallet and/or package depth sizes by adjusting telescoping bracket members 64' toward or away from base 18. It should also be appreciated that multiple safety and positioning devices 10 can be coupled to legs 30, 32 as may be desired, for example, to accommodate packages of various sizes and/or shapes while reducing a need to adjust the position of webbing 54 as described above.

Figure 3:
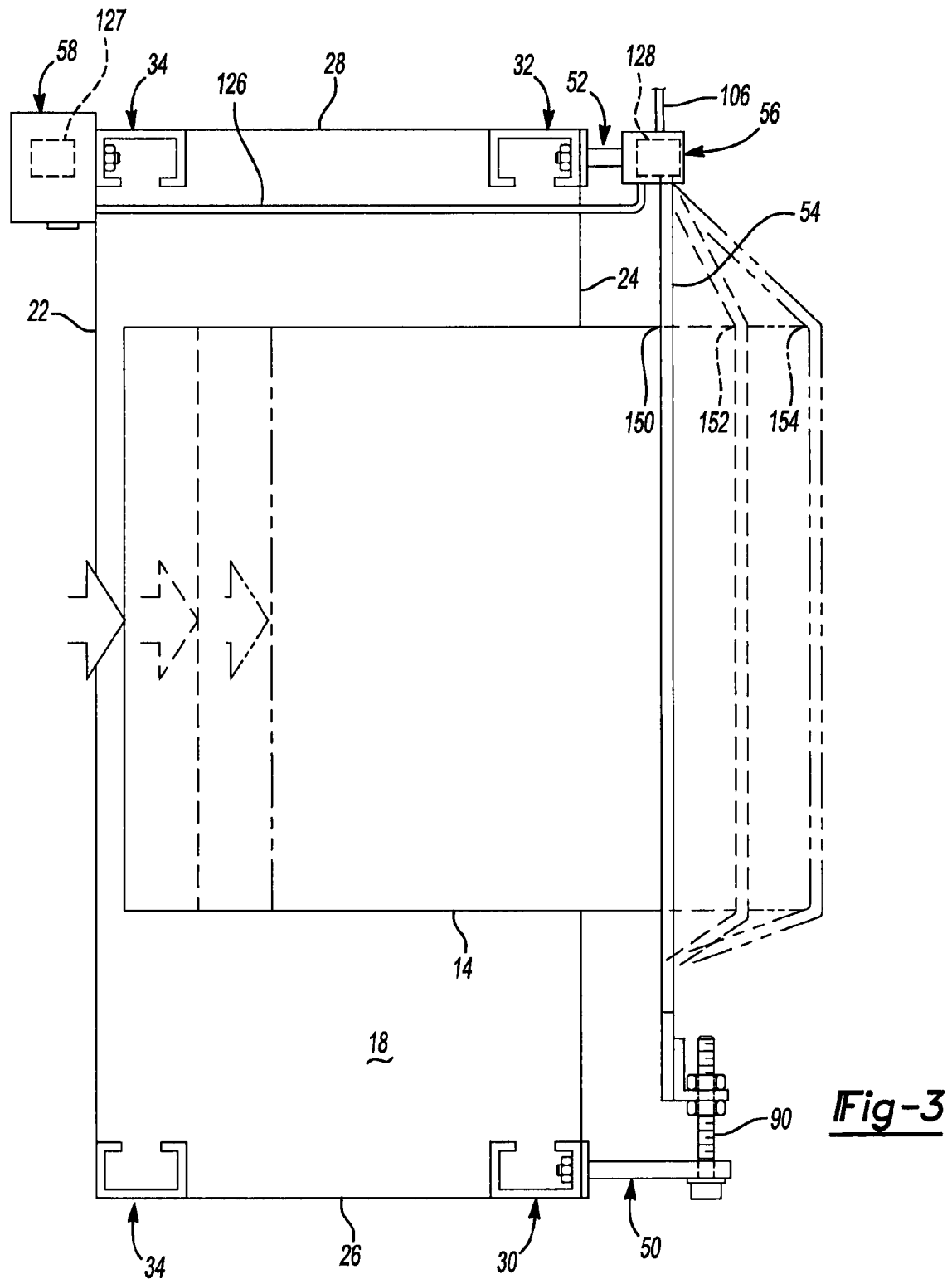
FIG. 3 is a top view of an item interacting with the safety and positioning device of FIG. 1 or 2 in accordance with the teachings of the present disclosure.

With particular reference to FIGS. 3 and 4, operation of the safety and positioning device 10 will be further described. As pallet 14 with packages 13 is received in rack 12, the pallet 14 can be advanced from the front side 22 to the back side 24 while observing signaling device 58. When the pallet 14 and packages 13 are advanced to a first position 150 so as to contact webbing 54, an initial amount of tension can be generated in the webbing 54 and sensed by tension sensor device 94. Alternatively, an initial amount of movement of the webbing 54 can be generated relative to movement sensing device 110. The initial amount of tension or movement generated in webbing 54 at first position 150 can be correlated to a predetermined amount of tension or movement associated with an end or threshold of the acceptable position range described above. The tension or movement sensing devices 94, 110 can generate an output signal to the signaling device 58 to illuminate the green indicator 134 when the webbing 54 experiences the predetermined amount of tension or movement associated with first position 150.

Alternatively, the tension or movement sensing devices 94, 110 can be calibrated to generate an output signal to illuminate green indicator 134 until an amount of tension or movement is generated in webbing 54 beyond the calibrated acceptable range of tension or movement, at which time the green indicator 134 would be turned off and the yellow indicator 136 would be illuminated.

Illumination of the green indicator 134 provides positive visual confirmation that the pallet is in a predetermined proper position range relative to the front and back sides 22, 24 of base 18. Such an indication is particularly useful when pallet 14 contains large packages or other items that can obstruct a forklift driver's view of rack 12 or where the pallet is being placed in a multiple level rack on a base that is above the forklift driver's line of sight.

If the pallet 14 is further advanced toward the back side 24 of rack 12, the pallet 14 can move from the first position 150 to a second threshold position 152 where a further amount of tension or movement is generated in webbing 54. The tension or movement sensing devices 94, 110 can be calibrated to process the further amount of tension or movement generated in webbing 54 from first position 150 to second position 152 to correspond to the predetermined intermediate acceptable position range described above and generate an output signal to the signaling device 58 to illuminate the yellow indicator 136.

Illumination of the yellow indicator 136 provides a visible indication that the pallet 14 has been placed or advanced beyond the predetermined acceptable position range or distance from the back side 24 of rack 12 and can be approaching the predetermined unacceptable position range. Upon movement of the pallet beyond the predetermined acceptable range of tension or movement of the webbing 54 (i.e., beyond position 150), the green indicator 134 can be turned off and the yellow indicator 136 can be illuminated as described above.

Continued movement of pallet 14 from the second position 152 to a third threshold position 154 can generate an additional amount of tension or movement in webbing 54, as generally shown in FIG. 3. The tension or movement sensing devices 94, 110 can be calibrated to process the additional amount of tension or movement generated in webbing 54 from second position 152 to third position 154 to correspond to the predetermined unacceptable position range described above and generate an output signal to the signaling device 58 to illuminate the red indicator 138. Upon movement of the pallet beyond the predetermined intermediate range of tension or movement of the webbing 54 (i.e., beyond position 152), the yellow indicator 136 can be turned off and the red indicator 138 can be illuminated as described above.

Illumination of the red indicator 138 provides a positive visual indication that the pallet 14 is in a predetermined unacceptable position range relative to at least the back side 24 of base 18. The pallet 14 can then be moved in an opposite direction toward the front side 22 so as to place pallet 14 in at least the intermediate position range between first and second positions 150, 152 and preferably the acceptable position range (i.e., between back side 24 and position 150). Upon such movement, the red indicator 138 can be turned off and either the yellow or green indicators 136, 134 can be illuminated depending on the placement of pallet 14 relative to the intermediate and acceptable position ranges, respectively.

In addition, the safety and positioning device 10 can be configured such that webbing 54 can no longer stretch or expand in tension, or move relative to movement device 110, upon tension or movement of webbing 54 to a predetermined limit of the unacceptable range, as generally indicated by third position 154 in FIG. 3. With such a configuration, the safety and positioning device 10 can additionally provide a positive stop or retention feature to substantially prevent pallet 14 from being further advanced beyond a limit of the unacceptable range or distance (i.e., beyond third position 154) from back side 24 of rack 12.

While one or more specific examples have been described and illustrated, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof.

What is claimed is:

1. A safety device for a storage rack, comprising:
    a length of webbing configured to span across a rear side of the storage rack adapted to store an item;
    a sensor device coupled to one end of the webbing; and
    a signaling device configured to communicate with the sensor device, the signaling device including at least one selectively actuatable alert indicator;
    wherein the sensor device is operable to sense an increase in tension in the webbing when the item is placed in a position on the storage rack so as to engage the webbing, the sensor device further operable to generate a signal indicative of the increase in tension and communicate the signal to the signaling device, the signaling device operable to actuate the at least one alert indicator responsive to the communicated signal to provide an indication of a position of the item relative to the storage rack.

2. The safety device of claim 1, wherein the signaling device is operable to actuate the alert indicator when the sensed increase in tension is greater than a predetermined threshold value.

3. The safety device of claim 1, wherein the sensor device is operable to sense an increase in tension relative to a predetermined initial value and a predetermined first threshold value and correlate the sensed increase in tension to a predetermined position of the webbing relative to the rear side of the storage rack, the predetermined position of the webbing under increased tension being indicative of a position of the item relative to the rear side of the storage rack, the generated signal being indicative of the increase in tension relative to the initial value and the first threshold value.

4. The safety device of claim 3, wherein the alert indicator includes a first alert indicator and a second alert indicator; and
    wherein the signaling device is operable to actuate the first alert indicator when the sensed increase in tension is greater than the initial predetermined value and less than the first threshold value, and is operable to actuate the second alert indicator when the sensed increase in tension is greater than the first threshold value.

5. The safety device of claim 3, wherein the sensor device is further operable to sense an increase in tension relative to a second predetermined threshold value, the threshold values increasing from the first threshold value to the second threshold value; and
    wherein the alert indicator includes first, second and third indicators, the signaling device operable to actuate the first indicator when the sensed increase in tension is greater than the initial value and less than the first threshold, to actuate the second indicator when the sensed increase in tension is greater than the first threshold and less then the second threshold, and to actuate the third indicator when the sensed increase in tension is greater than the second threshold.

6. The safety device of claim 5, wherein the first, second and third indicators comprise visual indicators that are selectively illuminated, the first indicator being illuminated with a green color, the second indicator with a yellow color, and the third indicator with a red color.

7. The safety device of claim 5, wherein the signaling device further comprises an audible alert indicator, the signaling device operable to actuate the audible alert indicator response to the output signal being indicative of the sensed increase in tension being greater than the second threshold.

8. The safety device of claim 7, wherein the signaling device is operable to actuate the audible alert indicator with a first audible alert when the output signal is indicative of the sensed increase in tension being greater than the first threshold, and to actuate the audible alert indicator with a second audible alert different than the first when the sensed increase in tension is greater than the second threshold.

9. The safety device of claim 5, wherein the webbing is configured to expand proportional to the increase in tension, and wherein the webbing is further configured to expand in tension only up to a predetermined third threshold greater than the second threshold, such that at the third predetermined threshold, the webbing is configured to substantially prevent further advancement of the item engaging the webbing.

10. The safety device of claim 1, wherein the length of webbing includes a woven polyester material, the length of webbing spanning across the rear side substantially parallel to the rear side.

11. The safety device of claim 1, wherein the storage rack comprises:
    a base for receiving the item and having a front side opposite the rear side, and first and second sides spaced apart from each other and connecting the respective front and rear sides; and
    a first pair of legs coupled to the base proximate the rear side and a second pair of legs coupled to the base proximate the front side;
    wherein the webbing is coupled at another end to a first bracket assembly arranged to be coupled to one of the first pair of legs, and the sensor device is coupled to a second bracket assembly arranged to be coupled to another of the first pair of legs such that the webbing spans across the rear side of the base so as to be substantially parallel to the rear side.

12. The safety device of claim 11, wherein the storage rack includes multiple levels, each level including the base, length of webbing, sensor device and signaling device.

13. The safety device of claim 11, wherein the first and second bracket assemblies each include:
   a first member arranged for coupling to one of the respective first pair of legs; and
   a second member slidably coupled to the first member in a telescoping configuration;
   wherein the sensor device is coupled to the second member of the second bracket assembly and the end of the webbing is coupled to the second member of the first bracket assembly, such that the webbing is adjustable relative to the rear side of the storage rack via the telescoping second members.

14. The safety device of claim 11, wherein the first and second bracket assemblies are slidably coupled to the first pair of legs so as to be vertically adjustable to vary a location of the webbing relative to the base.

15. The safety device of claim 11, further comprising an adjustment mechanism coupled at one end to the end of the webbing and at another end to the first bracket assembly, the adjustment mechanism configured to accommodate various span lengths of the rear side and to provide an initial amount of tension in the webbing.

16. A storage structure assembly, comprising:
   a storage rack including a base having a front side opposite a rear side, and first and second sides spaced apart from each other and connecting the respective front and rear sides, the base being configured to receive an item, a first pair of legs coupled to the base proximate the rear side and a second pair of legs coupled to the base proximate the front side; and
   a safety device including a first bracket and a second bracket coupled to the respective first pair of legs, a length of webbing configured to span across the rear side of the storage rack, a sensor device coupled to one of the first and second brackets, wherein the webbing is coupled at one end to the sensor device and at another end to the other of the first and second brackets, a signaling device configured to communicate with the sensor device, the signaling device including at least one selectively actuatable alert indicator;
   wherein the sensor device is operable to sense movement or a change in tension in the webbing when the item is placed in a position in the storage rack so as to engage the webbing, the sensor device further operable to generate a signal indicative of the movement or change in tension and communicate the signal to the signaling device, the signaling device operable to actuate the at least one alert indicator responsive to the communicated signal to provide an indication of a position of the item relative to the storage rack.

17. The storage structure assembly of claim 16, wherein the sensor device includes a movement sensing device having a retractor assembly and a sensor, the retractor assembly configured to adjustably receive the webbing and maintain a predetermined amount of tension in the webbing, the sensor arranged to sense movement of the webbing.

18. The storage structure of claim 16, wherein the sensor device is a tension sensor device configured to sense an increase in tension of the webbing.

19. The storage structure of claim 16, further comprising a storage rack having multiple levels, each level having the base configured to receive the item and the safety device, wherein at least one level of the multiple levels includes multiple safety devices coupled to the first pair of legs in a vertically stacked manner.

20. The storage structure assembly of claim 16, wherein the sensor device is operable to sense an increase in tension of the webbing relative to predetermined first, second and third threshold values, the tension increasing from the first to the third values; and
   wherein the signaling device further comprises an audible alert indicator and the selectively actuatable alert indicator includes first, second and third visual alert indicators configured to be illuminated in different colors, the signaling device operable to actuate the first indicator when the sensed increase in tension is between the first and second threshold values, the second indicator when the tension is between the second and third threshold values, and to actuate the third indicator when the sensed tension is greater than the third threshold.

21. The storage structure assembly of claim 20, wherein the webbing is configured to expand proportional to the increase in tension, and wherein the webbing is further configured to expand in tension only up to a predetermined fourth threshold greater than the third threshold, such that at the predetermined fourth threshold, the webbing is configured to substantially prevent further advancement of the item engaging the webbing in a direction away from the rear side of the storage rack.

* * * * *